United States Patent
Sarangdhar et al.

(10) Patent No.: US 10,089,247 B2
(45) Date of Patent: Oct. 2, 2018

(54) SYSTEM AND METHOD FOR COUPLING A HOST DEVICE TO SECURE AND NON-SECURE DEVICES

(71) Applicant: INTEL CORPORATION, Santa Clara, CA (US)

(72) Inventors: Nitin V. Sarangdhar, Portland, OR (US); Baiju V. Patel, Portland, OR (US); Tin-Cheung Kung, Folsom, CA (US); Joseph F. Cihula, Hillsboro, OR (US); Prashant Sethi, Folsom, CA (US); Vinay Kumar Rangineni, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 15/282,647

(22) Filed: Sep. 30, 2016

(65) Prior Publication Data

US 2018/0095900 A1    Apr. 5, 2018

(51) Int. Cl.
| | |
|---|---|
| *G06F 13/00* | (2006.01) |
| *G06F 12/14* | (2006.01) |
| *G06F 12/02* | (2006.01) |
| *G06F 13/28* | (2006.01) |
| *G06F 13/16* | (2006.01) |
| *G06F 9/455* | (2018.01) |
| *G06F 21/57* | (2013.01) |

(52) U.S. Cl.
CPC ...... *G06F 12/1425* (2013.01); *G06F 9/45558* (2013.01); *G06F 12/0223* (2013.01); *G06F 13/1668* (2013.01); *G06F 13/28* (2013.01); *G06F 21/57* (2013.01); *G06F 2009/45583* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 2009/0222816 A1* | 9/2009 | Mansell | G06F 12/145 718/1 |
| 2015/0089173 A1* | 3/2015 | Chhabra | G06F 12/1408 711/163 |
| 2015/0370727 A1* | 12/2015 | Hashimoto | G06F 12/1416 711/163 |
| 2015/0370728 A1* | 12/2015 | Yamada | G06F 12/1416 711/163 |
| 2017/0031838 A1* | 2/2017 | Mukherjee | G06F 12/1441 |

* cited by examiner

*Primary Examiner* — Sean D Rossiter
(74) *Attorney, Agent, or Firm* — Grossman, Tucker, Perreault & Pfleger, PLLC

(57) ABSTRACT

One embodiment provides an apparatus. The apparatus includes an input output memory management unit (I/O MMU), a non-secure operating system (OS) driver, a secure OS driver and a virtual machine monitor (VMM). The I/OMMU is to couple an I/O Controller to a memory. The I/O Controller is coupled to a secure device and a non-secure device and has one I/O Controller identifier. The non-secure OS driver is associated with the non-secure device. The secure OS driver is associated with the secure device. The VMM is to allocate a secure address space to a secure OS and a non-secure address space to a non-secure OS. The secure address space is non-overlapping with the non-secure address space.

15 Claims, 4 Drawing Sheets

SYSTEM AND METHOD FOR COUPLING A HOST DEVICE TO SECURE AND NON-SECURE DEVICES

FIELD

The present disclosure relates to a system, in particular to, a multi-device system.

BACKGROUND

A computing device may be configured to couple to one or more peripheral devices. The computing device may be configured to support virtualization which allows sharing of computing device resources between pluralities of virtual machine domains, typically managed by a virtual machine monitor (i.e., "hypervisor"). A respective subset of the peripheral devices may be included in each domain.

The computing device may include an input-output (I/O) controller configured to physically couple to the peripheral devices and to provide an interface between the peripheral devices and the computing device. In some situations, direct memory access (DMA) may be utilized to transfer data and/or commands between the computing device and one or more of the peripheral devices.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
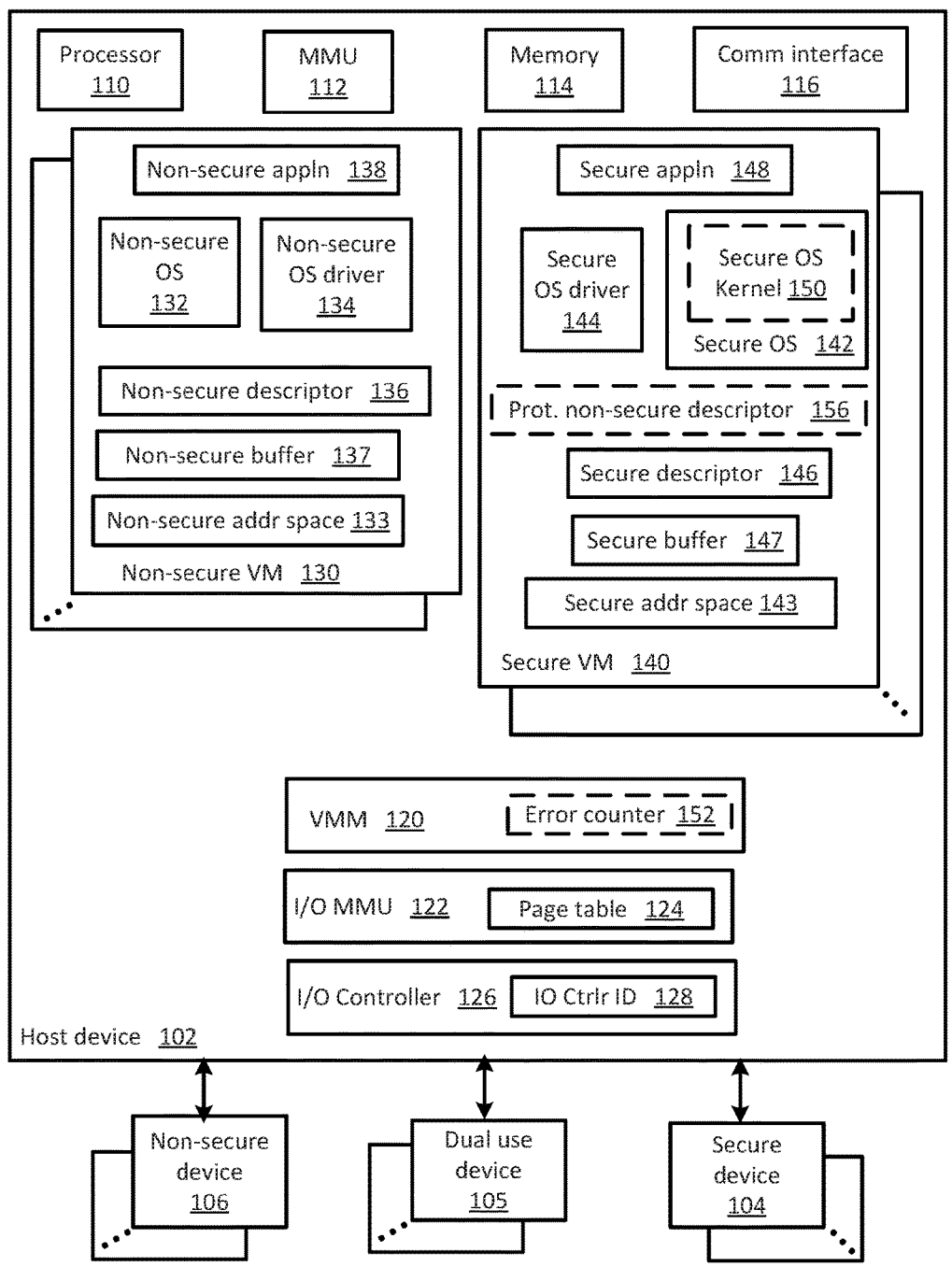
FIG. 1 illustrates a functional block diagram of a multi-device system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

The peripheral devices may include both non-secure devices and secure devices. The non-secure devices may be associated with a non-secure virtual machine (VM) in a non-secure domain and the secure devices may be associated with a secure VM in a secure domain. Non-secure devices are not allowed to access a secure virtual machine.

A computing device may include an I/O memory management unit (I/O MMU) configured to couple one or more I/O Controllers to a memory. Each I/O Controller may have a respective I/O Controller identifier that may be used by the I/O MMU to identify the I/O Controller. In a direct memory access (DMA) operation, the I/O MMU may be configured to determine whether a selected I/O Controller may access a target address and thus a selected virtual machine memory based, at least in part, on the I/O Controller identifier. A selected I/O Controller may be coupled to a plurality of peripheral devices that includes both non-secure devices and secure devices. The identities of the non-secure devices and the secure devices are unknown to the I/O MMU. Thus, the I/O MMU may be unable to differentiate between secure devices and non-secure devices coupled to the selected I/O Controller. Thus, a secure operation (e.g., biometric authentication performed using a secure device performing DMA to a secure domain) may be compromised by an attacker using DMA to access a secure domain by a non-secure device.

Generally, this disclosure relates to a multi-device system. An apparatus, method and/or system are configured to allow a host device to couple to a plurality of peripheral devices that includes one or more secure devices and one or more non-secure devices. The apparatus, method and/or system are configured to differentiate between DMA by a secure device or DMA by a non-secure device, without modifications to the hardware. In other words, the apparatus, system and/or method are configured to reduce the likelihood of, and/or prevent, access to the secure domain by an attacker utilizing a non-secure device and DMA to attack a host device that includes an I/O Controller that has a single I/O Controller identifier.

The host device includes a non-secure virtual machine (VM), a secure VM, a virtual machine monitor (VMM), an I/O memory management unit (I/O MMU) and an I/O Controller that has one I/O Controller identifier. The non-secure VM may include a non-secure operating system (OS) and a non-secure OS driver. The secure VM may include a secure OS and a secure OS driver.

The non-secure OS driver is configured to manage a non-secure device and the secure OS driver is configured to manage a secure device. During non-secure operations, the non-secure OS driver may manage transfer of data and/or commands between non-secure devices and the non-secure VM. During secure operations, the secure OS driver may manage transfer of data and/or commands between secure devices and the secure VM. Non-secure operations involving the non-secure OS driver, e.g., non-secure DMA operations, may be generally performed more often than corresponding secure DMA operations involving the secure OS driver and the non-secure OS driver may be relatively vulnerable to malware attack while the secure OS driver may be generally protected from malware attack.

The VMM is configured to allocate a secure address space associated with the secure VM and a non-secure address space associated with the non-secure VM. The secure address space is non-overlapping with the non-secure address space. For example, each address in the secure address space may be configured to have a most significant bit (MSB) different from a most significant bit of each address in the non-secure address space. The most significant bit may then be utilized during DMA operations to determine whether a target address of, e.g., a DMA buffer, corresponds to the secure address space or the non-secure address space.

In one embodiment, addresses associated with secure DMA operations may be allocated using address space layout randomization (ASLR). In other words, a random address may be allocated in the secure address space for a secure DMA buffer in response to a request from the secure OS driver at a 4 Kbyte (kilobyte) granularity. For example, the request may be associated with a secure operation, e.g., biometric authentication. For example, a DMA transfer may include data corresponding to a plurality of 4 Kbyte sized DMA buffers. A corresponding descriptor may thus include a linked list of the plurality of secure DMA buffer addresses. Each secure or DMA buffer address may thus be allocated randomly. Attempts by a non-secure device and/or non-secure OS driver to identify each random address may then be detected by, for example, monitoring I/O MMU page table faults. In other words, each wrong attempt may result in an I/O MMU page table fault and a count of page table faults greater than a threshold may then indicate malicious intent. A corresponding secure operation may then be terminated with failure if the number of I/O MMU page table faults is greater than the threshold. This embodiment is relatively low latency but may not detect every attempt to access the secure address space by a non-secure device and/or non-secure OS driver. In other words, latency between a request to initiate the secure operation and initiation of the secure operation may be generally unaffected by the ASLR. An attacker may possibly guess a random address but the likelihood of a successful guess is relatively small. For example, for a 64 bit address with the most significant bit known and a 1 MB (megabyte) buffer size, each guess has a likelihood of success of one in $2^{63}/10_6$ or about one in $10^{13}$ and for a 4 KB (kilobyte) buffer size, each guess has a likelihood of success of one in $2^{62}/4*10^3$ or about 2.5 in $10^{16}$. Thus, the likelihood of guessing more than one random address decreases exponentially with the number of addresses.

In another embodiment, in response to a request for a secure operation, control of non-secure DMA operations may be temporarily transferred from the non-secure OS and non-secure OS driver to the secure OS and/or the secure OS driver. For example, control of DMA descriptors (e.g., transfer request blocks (TRBs)) that contain one or more addresses of target DMA buffers, may be transferred from the non-secure OS to the secure OS and/or secure OS driver. The secure OS driver may then be configured to wait a time interval to allow outstanding non-secure descriptors to be consumed and to then attempt to validate target addresses included in a remaining non-secure descriptor if fewer than all of the outstanding non-secure descriptors have been consumed after the time interval. The secure OS driver is configured to validate target addresses included in new non-secure DMA descriptors. The secure OS driver may be further configured to copy each remaining, i.e., non-consumed, non-secure descriptor to the secure address space as a protected non-secure descriptor to prevent write access to the protected non-secure descriptors by the non-secure OS. For example, an equivalent secure descriptor, i.e., a protected non-secure descriptor, corresponding to each non-consumed non-secure descriptor may be created in the secure address space. The secure operation may then be allowed to proceed when each non-secure descriptor has been at least one of consumed and/or validated and moved to a secure address space as a protected non-secure descriptor.

After the secure operation completes, each protected non-secure descriptor may be transferred to the non-secure OS and control of each non-secure descriptor may be transferred to the non-secure OS driver. It may be appreciated, that secure operations such as biometric authentication may correspond to a fraction of DMA operations between a host device and one or more peripheral devices. There may be a nonzero latency associated with draining and/or validating non-secure descriptors prior to allowing the associated secure operation to start. Such latency may be experienced only with respect to secure operations that utilize DMA and may thus be limited. Guessing a target address may not result in a successful attack in this embodiment.

In another embodiment, the secure device or the non-secure device may correspond to a dual use device. As used herein, a dual use device is a peripheral device that may be utilized for secure operations and/or non-secure operations. A camera is one example of a dual use device. The camera may be utilized, by a user, to capture user-selected images and stored to the host device (i.e., non-secure operations). The camera may also be utilized for, e.g., biometric authentication (i.e., secure operations).

In operation, in response to receiving a request for a secure operation related to a dual use device, an outstanding non-secure descriptor associated with the dual use device may be allowed to be consumed. Control of the dual use device may then be transferred from the non-secure OS driver to the secure OS driver after the outstanding non-secure descriptors are consumed. One or more random address(es) related to receive DMA buffer(s) may then be allocated in the secure address space and stored to an I/O MMU page table. Receive DMA buffers may then be allocated at locations associated with the random addresses and one or more corresponding secure descriptor(s) may be initialized with the DMA buffer address(es). The secure operation may then be allowed to proceed. Control of the dual use device may be transferred back to the non-secure OS driver after the secure operation completes. Thus, a dual use device may be utilized for a secure operation, e.g., biometric authentication.

Thus, for a host device that includes an I/O Controller that has one I/O Controller identifier and is coupled to a plurality of peripheral devices, including one or more secure devices and one or more non-secure devices, an attempt to access, via DMA, a secure address space by a non-secure device and/or non-secure OS driver may be detected, without modifying hardware.

FIG. 1 illustrates a functional block diagram of a multi-device system 100 consistent with several embodiments of the present disclosure. Multi-device system 100 may include a host device 102, one or more secure devices, e.g., secure device 104, and one or more non-secure devices, e.g., non-secure device 106, and may further include one or more dual use devices, e.g., dual use device 105. Host device 102 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Secure device 104 may include, but is not limited to, a camera, a fingerprint reader, a palm reader, etc. Non-secure device 106 may include, but is not limited to, a mouse, a keyboard, an audio capture device, a video capture device, etc. Dual use device 105 may include, but is not limited to, a camera, an audio capture device, etc.

Host device 102 includes a processor 110, a memory management unit (MMU) 112, a memory 114 and a communication interface 116. For example, processor 110 may correspond to a single core or a multi-core general purpose processor, such as those provided by Intel® Corp., etc. The MMU 112 may be included in or coupled to the processor 110 and is configured to manage access to memory 114 by processor 110. Communication interface 116 may be configured to couple host device 102, wired and/or wirelessly, to one or more communication partners (not shown). Communication interface 116 may comply and/or be compatible with one or more communication protocols.

Host device 102 may include circuitry such as an I/O MMU 122, an I/O Controller 126 and logic such as virtual machine monitor (VMM) 120, one or more non-secure VMs, e.g., non-secure VM 130, and one or more secure VMs, e.g., secure VM 140. I/O Controller 126 includes an I/O Controller identifier 128 configured to uniquely identify I/O Controller 126 to, e.g., I/O MMU 122. Host device 102 may further include one or more other I/O Controllers (not shown). I/O MMU 122 may be configured to access I/O MMU page table 124. I/O MMU page table 124 may be configured by, for example, VMM 120, to contain page table entries relating a source identifier, e.g., I/O Controller identifier 128, to a target address range. The source identifier is configured to identify a source of, e.g., a DMA operation. I/O MMU page table 124 may be utilized by I/O MMU 122 to determine whether a source identifier provided with a DMA request is allowed to continue an operation associated with a corresponding target address. A DMA request that includes a source identifier that is not allowed to perform the operation associated with the corresponding target address in the I/O MMU page table 124 may trigger a page fault error (i.e., an I/O MMU page table fault), as described herein.

Non-secure VM 130 may include non-secure OS 132, non-secure OS driver 134, one or more non-secure descriptors, e.g., non-secure descriptor 136, one or more non-secure DMA buffers, e.g., non-secure buffer 137, and one or more non-secure applications, e.g., non-secure application 138. For example, non-secure applications may include, but are not limited to, word processing applications, spreadsheet applications, web browsers, etc. Secure VM 140 may include secure OS 142, secure OS driver 144, one or more secure descriptors, e.g., secure descriptor 146, one or more secure DMA buffers, e.g., secure buffer 147, and one or more secure applications, e.g., secure application 148. For example, secure applications may include, but are not limited to biometric authentication applications, secure audio capture applications, etc. Secure OS 142 may further include secure OS kernel 150.

In some DMA operations, a descriptor may be utilized that includes a pointer to a DMA buffer, e.g., an address. The descriptor may be configured to include a plurality of addresses in a linked list. Each address in the descriptor may be configured, by the OS driver, to identify a DMA buffer. For example, an amount of data in a DMA transfer may be greater than a size of one DMA buffer. In other words, one buffer address may point to a DMA buffer of size 4 kB (kilobytes) while a DMA transfer may contain, e.g., 128 kB. Thus, the corresponding descriptor may include 32 (128 kB/4 kB) buffer addresses in a linked list.

Once the descriptor is ready, the OS driver may issue a command to the I/O Controller to perform an operation, e.g., a Read operation. After receiving the command, the I/O Controller may execute the read operation with the non-secure device or secure device and return the data to the buffer. The I/O Controller may then generate an interrupt to signal completion of the transaction. On receipt of the interrupt, the OS driver is configured to review the I/O Controller status and conclude that the associated DMA buffer has data available to be processed. After the data has been processed, i.e., consumed, the address may be removed, overwritten and/or a next address in the descriptor ring (i.e., linked list) may be updated. For example, the descriptor may correspond to and/or may include a transfer request block (TRB) related to an extensible host controller interface, as described herein. Thus, the descriptor may be utilized by, e.g., secure OS driver 144 to monitor and/or control DMA operations of non-secure device 106 and/or secure device 104.

Non-secure OS driver 134 is configured to provide an interface between non-secure OS 132, non-secure VM 130 and non-secure device 106. Similarly, secure OS driver 144 is configured to provide an interface between secure OS 142, secure VM 140 and secure device 104. Data and/or commands may be transferred between non-secure VM 130 (and, e.g., non-secure buffer 137) and non-secure device 106 by non-secure OS driver 134 via DMA. Similarly, data and/or commands may be transferred between secure VM 140 (and, e.g., secure buffer 147) and secure device 104 by secure OS driver 144 via DMA. In some embodiments, during operation, secure VM 140 may include protected non-secure descriptors 156, as described herein.

In operation, VMM 120 may be configured to allocate a secure DMA address space, e.g., secure DMA address space 143, to secure VM 140 and a non-secure DMA address space, e.g., non-secure DMA address space 133, to non-secure VM 130. VMM 120 may be configured to allocate the respective DMA address spaces so that the secure DMA address space is non-overlapping with the non-secure DMA address space. For example, VMM may allocate the respective DMA address spaces so that the secure DMA address space has a most significant bit (MSB) that is different from the MSB of each address in the non-secure DMA address space. Addresses included in the secure address space 143 may then be differentiated from addresses included in the non-secure address space 133 by the corresponding MSB. For example, the MSB of addresses included in the secure address space 143 may be set to logic one and the MSB of addresses included in the non-secure address space 133 may be set to logic zero. Thus, whether a target address is included in the non-secure address space 133 or the secure address space 143 may be determined based, at least in part, on the most significant bit of the target address.

Secure application 148 may be configured to initiate one or more secure operations that may include transfer of data and/or commands between secure device 104 and host device 102. The transfer of data and/or commands may be performed via DMA by secure OS driver 144, I/O Controller 126 and secure device 104. For example, the secure operations may include biometric authentication. Continuing with this example, secure device 104 may then correspond to a camera and the biometric data may correspond to a facial image. Secure VM 140 may then include a reference facial image and secure device 104 may be configured to capture an authentication facial image in real time, i.e., of a user present in the field of view of the camera. The authentication facial image may then be transferred to secure VM 140 and secure buffer 147 via DMA.

In an attack situation, an attacker utilizing non-secure device 106 and non-secure OS driver 134 may, for example, attempt to provide a previously captured facial image. The previously captured facial image may be configured to correspond to the reference facial image. The previously captured facial image may be stored to a storage device coupled to host device 102 by I/O Controller 126. The storage device may thus correspond to non-secure device 106. In order for such an attack to be successful, the attacker must either know or successfully guess the target address of each DMA buffer (e.g., secure buffer 147) configured to store at least a portion of the authentication facial image for consumption by the secure application 148. For example, the consumption may include comparing the authentication facial image with a reference facial image.

In an embodiment, each time a DMA buffer is allocated, e.g., in response to a request from the secure OS driver 144, the VMM 120 is configured to allocate the DMA buffer at a random address (and associated address range) in the secure DMA address space 143 included in secure VM 140. It may be appreciated that, with a 64 bit address and the most significant bit set to logic one, the secure address space may include $2^{63}$ bytes which is on the order of $10^{18}$ addresses. A plurality of DMA buffers may be allocated to support a DMA transfer. Each DMA buffer may be allocated at a corresponding random address in the secure address space 143 The likelihood of an attacker successfully guessing one random address is relatively small and likelihood of guessing more than one random address decreases exponentially with the number of addresses, thus illustrating a benefit of address space layout randomization (ASLR).

The allocated random addresses (i.e., starting address of secure buffer 147) and corresponding address ranges may then be stored to an I/O MMU page table, e.g., I/O MMU page table 124, associated with a source identifier, e.g., I/O Controller identifier 128. I/O MMU page table 124 is configured to be utilized by I/O MMU 122 to determine whether the source of a DMA operation has permission to access each target address and associated address range. The source of the DMA operation is identified by a source identifier, e.g., a tag. The I/O MMU 122 is configured to determine based, at least in part, on the source identifier (e.g., I/O Controller identifier 128), whether the source (e.g., I/O Controller 126) has permission to access each target address and associated address range provided by the source. The source identifier associated with non-secure device 106 and secure device 104, both coupled to I/O Controller 126, is I/O Controller identifier 128. Thus, the source identifier (i.e., I/O Controller identifier 128) may not be used by I/O MMU 122 to differentiate between non-secure device 106 and secure device 104.

An attacker, utilizing non-secure OS driver 134 and non-secure device 106 coupled to I/O Controller 126, has the appropriate source identifier, i.e., I/O Controller identifier 128. However, the attacker must guess each target address for each DMA buffer. With a relatively large number of trials, a target address may be successfully identified. Each attempt by the attacker includes providing a possible target address to I/O MMU 122. I/O MMU 122 is configured to determine whether the possible target address is included in the I/O MMU page table 124 associated with I/O Controller identifier 128. If the possible target address is not included in I/O MMU page table 124, a I/O MMU page table fault error may be triggered.

VMM 120 is configured to monitor (e.g., count) I/O MMU page table faults. VMM 120 may thus include error counter 152 configured to store a count of a number of I/O MMU page table faults that occur in response to initiation of a secure operation (e.g., a biometric authentication). Secure kernel 150 may be configured to receive and/or capture the count of page faults. If the number of page faults is greater than a threshold, then the secure operation may be terminated with failure by, e.g., VMM 120 and/or secure kernel 150. In one example, the threshold may be equal to zero. In this example, any I/O MMU page table fault may terminate the secure operation with failure. In another example, the threshold may be equal to one. A threshold equal to one is configured to allow one retry. Thus, an attacker has a relatively small likelihood of guessing any of the random addresses of the DMA buffers (e.g., secure buffer 147) included in secure VM 140.

In another embodiment, control of DMA operations related to non-secure OS driver 134, and, e.g., non-secure device 106, may be transferred to secure OS driver 144 in response to a request for a secure operation. It may be appreciated that secure operations may generally correspond to a relatively small fraction of operations for a host device, e.g., host device 102. For example, a user of host device 102 may authenticate a relatively small number of times and may generally perform non-secure operations, e.g., file transfers, web browsing, etc., most of the time. Thus, most of the time, non-secure OS driver 134 may manage such non-secure DMA operations. Overhead associated with secure operations may thus be avoided most of the time. A request for a secure operation may then be utilized to trigger the operations of this embodiment.

Non-secure VM 130 may include one or more non-secure descriptors, e.g., non-secure descriptor 136 and the corresponding non-secure DMA buffers, e.g., non-secure buffer 137. Secure VM 140 may include one or more secure descriptors, e.g., secure descriptor 146 and the corresponding secure DMA buffers, e.g., secure buffer 147. During operations of this embodiment, the secure VM 140 may contain a secure descriptor 146, corresponding to a buffer from the non-secure DMA address space such as non-secure buffer 137.

In response to a request for a secure operation, control of each non-secure descriptor 136 and control of each non-secure device, e.g., non-secure device 106, may be transferred from a non-secure OS driver 134 to a secure OS driver 144. One or more of the outstanding non-secure descriptors may be related to legitimate non-secure DMA operations and/or may be related to malicious DMA operations. Further, new DMA operations may be initiated by, e.g., non-secure application 138 and/or secure application 148. Secure OS driver 144 may then be configured to validate (i.e., attempt to validate) new descriptors associated with new DMA operations. Attempting to validate may include determining whether a DMA operation from a non-secure device, e.g., non-secure device 106, is directed to non-secure VM 130 or secure VM 140. For example, validating may include determining whether the MSB of a target address corresponds to non-secure address space 133 or secure address space 143. DMA operations from a non-secure device 104 or secure device 106 may be allowed to the non-secure address space 133. DMA operations from a secure device 106 may be allowed to the secure address space 133 while DMA operations from a non-secure device 104 may be disallowed to secure address space 133.

The secure OS driver 144 may be configured to pause for a time interval to allow existing outstanding non-secure descriptors to be consumed. Thus, the secure operation may not be initiated immediately in response to the request for the secure operation. During the time interval, one or more non-secure applications, e.g., non-secure application 138, may be executing, processing data stored to non-secure DMA buffers, and thus consuming one or more non-secure descriptors. For example, a duration of the time interval may be 100 mS (milliseconds) to complete consumption of outstanding non-secure descriptors. In another example, the duration of the time interval may be greater than or less than 100 mS. The secure OS driver 144 may then be configured to attempt to validate any target addresses included in the remaining non-secure descriptors if fewer than all of the outstanding non-secure descriptors have been consumed after the time interval. Attempting to validate target addresses is configured to determine whether any of the outstanding non-secure descriptors includes an address of a secure buffer, e.g., secure buffer 147. Validated non-secure descriptors may only include target addresses associated with non-secure buffers, e.g., secure buffer 137. For example, validating target addresses may include determining whether or not the MSB is a logic one.

The secure OS driver 144 may be further configured to modify behavior of the DMA read operation initiated by the I/O Controller 126 such that it no longer reads the non-secure descriptors but only reads the secure descriptors (or protected non-secure descriptors 156, as described herein) from the secure address space. Since the attacker does not have access to secure address space, a validated descriptor, i.e., a protected non-secure descriptor 156, cannot be changed by an attacker. After the non-secure descriptors have been consumed or validated and under control of the secure device driver 144 (e.g., moved to the secure address space as a protected non-secure descriptor 156), the secure operation may be allowed to proceed. After the secure operation completes, each protected non-secure descriptor may then be transferred to the non-secure OS 132. Control of each non-secure descriptor, e.g., non-secure descriptor 136, may be transferred to the non-secure OS driver 134.

Thus, an attacker may be prevented from using non-secure descriptors to attack a secure operation. In other words, an attacker, unable to access and/or control the secure VM 140 and thus the secure OS 142 and/or secure OS driver 144, may be similarly unable to attack the secure operation.

In another embodiment, a secure device or a non-secure device may correspond to a dual use device, e.g., dual use device 105. The dual use device 105 may be utilized for both non-secure operations and secure operations. In response to receiving a request for a secure operation related to the dual use device 105, an outstanding non-secure descriptor, e.g., non-secure descriptor 136, associated with the dual use device 105 may be allowed to be consumed. The outstanding non-secure descriptor may (or may not) be associated with a legitimate non-secure operation of the dual use device 105. Control of the dual use device 105 may then be transferred from the non-secure OS driver 134 to the secure OS driver 144 after the outstanding non-secure descriptor, e.g., non-secure descriptor 136, is consumed or an equivalent secure descriptor, i.e., a protected nonsecure descriptor, is created after validating the non-secure descriptor DMA address target. The secure operation may then be configured to execute. Control of the dual use device 105 may be transferred back to the non-secure OS driver 134 after the secure operation completes. Thus, a dual use device may be utilized for both a non-secure operation and a secure operation and an attack on the secure operation may be detected and/or prevented.

Thus, a host device, coupled to one or more secure device and/or one or more non-secure device by an I/O Controller that has one I/O Controller identifier, may be configured to detect and/or prevent an attack against a secure operation. The apparatus, method and/or system are configured to detect attempts to access a secure address space via DMA by a non-secure device, without modifications to the hardware.

Figure 2:
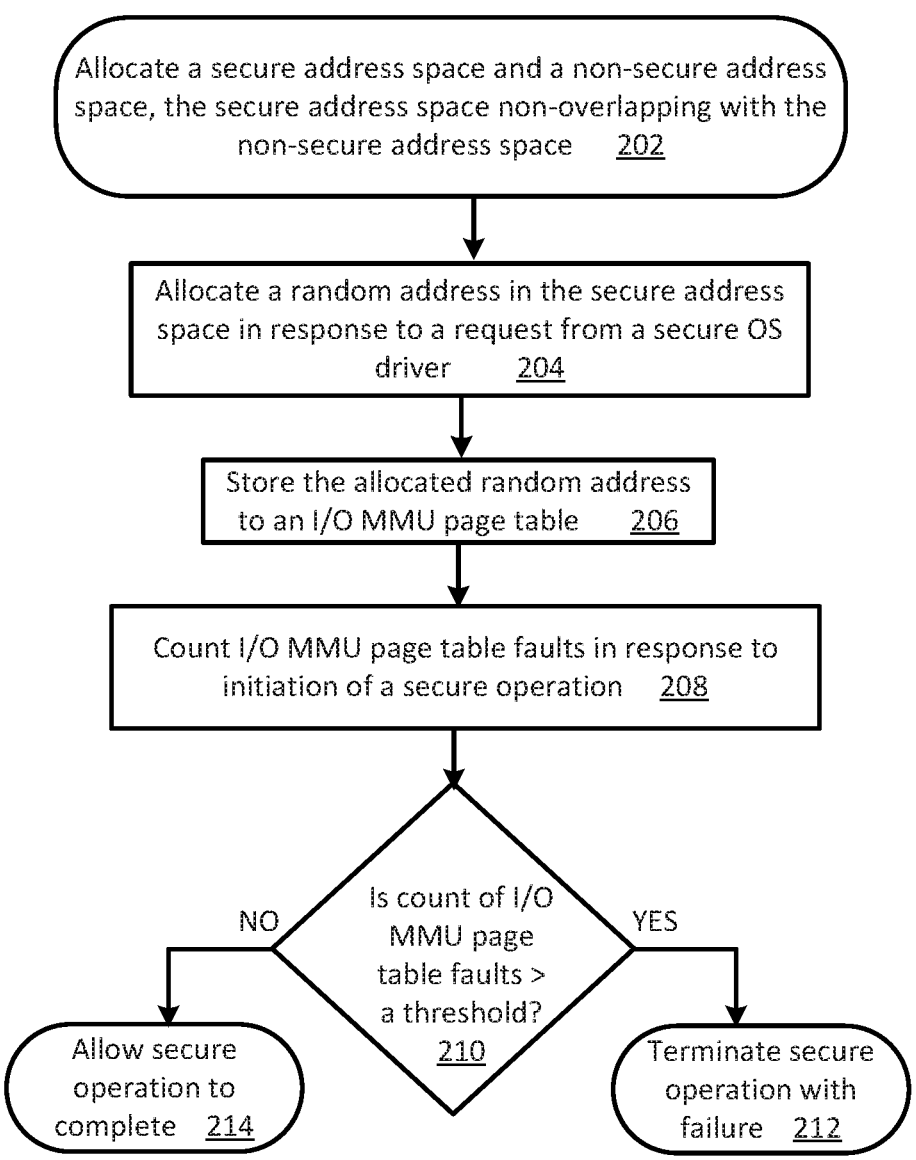
FIG. 2 is a flowchart of address space randomization operations according to one example embodiment of the present disclosure.

FIG. 2 is a flowchart 200 of address space randomization operations according to one example embodiment of the present disclosure. In particular, the flowchart 200 illustrates utilizing ASLR to reduce the likelihood that an attacker can successfully attack a secure operation. The operations may be performed, for example, by VMM 120, I/OMMU 122, secure OS driver 144 and/or secure kernel 150 of FIG. 1.

Operations of this embodiment may begin with allocating a secure address space and a non-secure address space at operation 202. The secure address space is configured to be non-overlapping with the non-secure address space. For example, each address in the secure address space may have a most significant bit different from a most significant bit of each address in the non-secure address space. Operation 204 includes allocating a random address in the secure address space in response to a request from a secure OS driver. A plurality of random addresses may be allocated. The allocated random address may be stored to an I/O MMU page table at operation 206. Operation 208 may include counting I/O MMU page table faults in response to initiation of a secure operation. Operation 210 may include determining whether a count of I/O MMU page table faults is greater than a threshold. If the count of I/O MMU page table faults is greater than the threshold, the secure operation may be terminated with failure at operation 212. If the count of I/O MMU page table faults is less than or equal to the threshold, the secure operation may be allowed to complete at operation 214.

Thus, ASLR and I/O MMU page table fault detection may be utilized to reduce a likelihood that an attacker may successfully attack a secure operation.

Figure 3:
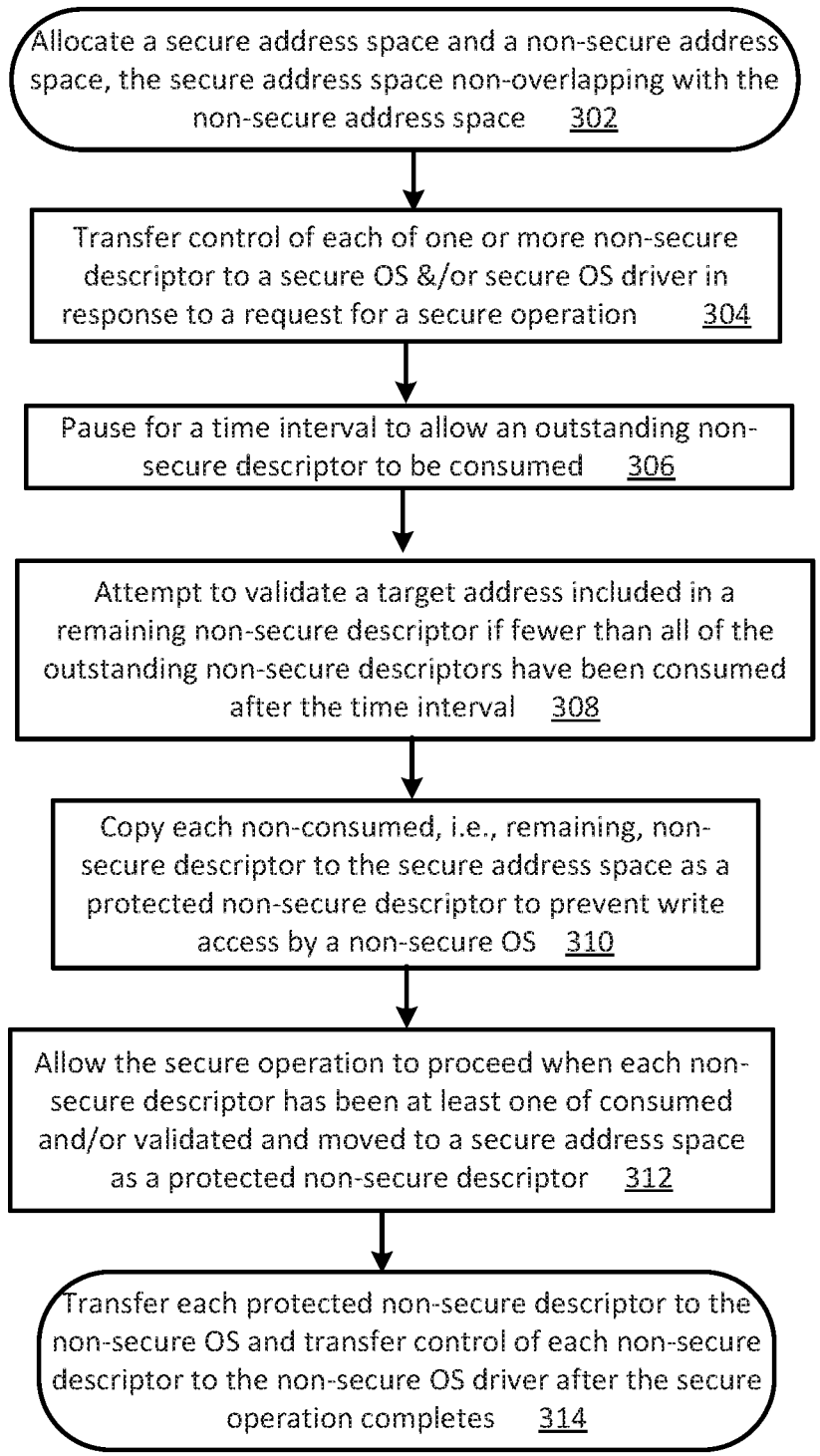
FIG. 3 is a flowchart of control transfer operations according to another example embodiment of the present disclosure.

FIG. 3 is a flowchart 300 of control transfer operations according to another example embodiment of the present disclosure. In particular, the flowchart 300 illustrates transferring control of non-secure descriptors to the secure OS driver to prevent an attack on a secure operation. The operations may be performed, for example, by VMM 120, secure OS 142 and/or secure OS driver 144 of FIG. 1.

Operations of this embodiment may begin with allocating a secure address space and a non-secure address space at operation 302. The secure address space is configured to be non-overlapping with the non-secure address space. Operation 304 may include transferring control of each of one or more non-secure descriptor to a secure OS and/or secure OS driver. The control may be transferred in response to a request for a secure operation. Operation 306 may include pausing for a time interval to allow an outstanding non-secure descriptor to be consumed. An attempt to validate a target address included in a remaining non-secure descriptor may be performed at operation 308. For example, the attempt to validate the target address may be performed if fewer than all of the outstanding non-secure descriptors have been consumed after the time interval. Each non-consumed, i.e., remaining, non-secure descriptor may be copied to the secure address space as a protected non-secure descriptor to prevent write access by the non-secure OS at operation 310. For example, an equivalent secure descriptor, i.e., a protected non-secure descriptor, corresponding to each non-consumed non-secure descriptor may be created in the secure address space. The secure operation may be allowed to proceed when each non-secure descriptor has been at least one of consumed and/or validated and moved to a secure address space as a protected non-secure descriptor at operation 312. Each protected non-secure descriptor may be transferred to the non-secure OS and control of each non-secure descriptor may be transferred to the non-secure OS driver after the secure operation completes at operation 314.

Thus, control of new non-secure descriptors may be transferred to the secure OS driver and the secure operation may not be initiated until the outstanding non-validated non-secure descriptors have been consumed and/or validated and moved to a secure address space, i.e., copied as a protected non-secure descriptor.

Figure 4:
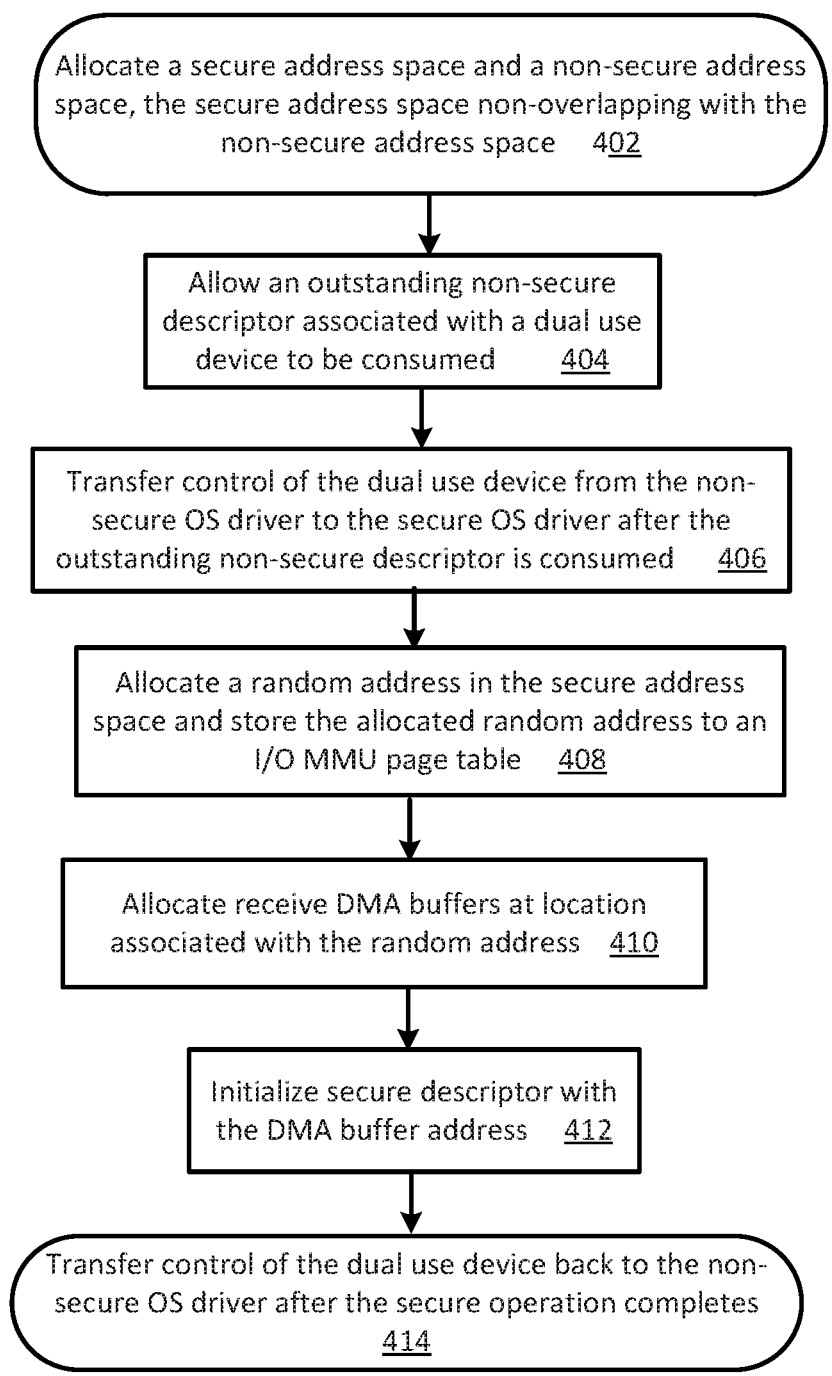
FIG. 4 is a flowchart of dual use device operations according to another example embodiment of the present disclosure.

FIG. 4 is a flowchart 400 of dual use device operations according to another example embodiment of the present disclosure. In particular, the flowchart 400 illustrates transferring control of non-secure descriptors to the secure OS driver to prevent an attack on a secure operation when the secure device or non-secure device is a dual use device. The operations may be performed, for example, by VMM 120, I/OMMU 122, secure OS 142 and/or secure OS driver 144 of FIG. 1.

Operations of this embodiment may begin with allocating a secure address space and a non-secure address space at operation 402. The secure address space is configured to be non-overlapping with the non-secure address space. An outstanding non-secure descriptor associated with a dual use device may be allowed to be consumed at operation 404. Control of the dual use device may be transferred from the non-secure OS driver to the secure OS driver after the outstanding non-secure descriptor is consumed at operation 406. Operation 408 may include allocating a random address in the secure address space and storing the allocated random address to an I/O MMU page table. Received DMA buffers may be allocated at a location associated with the random address at operation 410. A secure descriptor may be initialized with the DMA buffer address at operation 412. Control of the dual use device may be transferred back to the non-secure OS driver after the secure operation completes at operation 414.

Thus, attacks against a dual use device that may correspond to a secure device or a non-secure device may be detected and/or prevented.

While the flowcharts of FIGS. 2 through 4 illustrate operations according various embodiments, it is to be understood that not all of the operations depicted in FIGS. 2 through 4 are necessary for other embodiments. In addition, it is fully contemplated herein that in other embodiments of the present disclosure, the operations depicted in FIGS. 2, 3 and/or 4 and/or other operations described herein may be combined in a manner not specifically shown in any of the drawings, and such embodiments may include less or more operations than are illustrated in FIGS. 2 through 4. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 110 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the host device 102 or other systems may be combined in a system-on-a-chip (SoC) architecture.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

Host device 102, I/O Controller 126, secure device 104, non-secure device 106 and/or dual use device 105 may comply or be compatible with eXtensible Host Controller Interface for Universal Serial Bus (xHCI) specification Revision 1.1, released Dec. 20, 2013, by Intel® Corp., and/or related and/or later and/or earlier versions of this specification, e.g., eXtensible Host Controller Interface for Universal Serial Bus (xHCI) specification Revision 1.0 released May 21, 2010.

Host device 102, I/OMMU 122 may comply or be compatible with VT-d Intel® Virtualization Technology for Directed I/O Architecture Specification, Revision 2.0, released January 2012, by Intel® Corp., and/or related and/or earlier and/or later versions of this specification, e.g., VT-d Intel® Virtualization Technology for Directed I/O Architecture Specification Revision 2.4, released June 2016.

Host device 102, I/O Controller 126 and/or I/OMMU 122 may comply or be compatible with PCI Express® Base Specification Revision 3.1, released Oct. 8, 2014, by PCI SIG (Peripheral Component Interface Special Interest Group), and/or related and/or earlier and/or later versions of this specification, e.g., PCI Express® Base Specification Revision 3.0, released Nov. 10, 2010, and/or PCI Express® Base Specification Revision 3.1a, released Dec. 7, 2015.

The operating systems 132, 142 are configured to manage system resources and control tasks that are run on, e.g., non-secure VM 130, secure VM 140. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. The virtual machine monitor (or hypervisor) 120 may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised of a dedicated sub-system such as, for example, a TCP offload engine and/or a network controller. The TCP offload engine circuitry may be configured to provide, for example, packet transport, packet segmentation, packet reassembly, error checking, transmission acknowledgements, transmission retries, etc., without the need for host CPU and/or software involvement.

The memory 114 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable storage devices.

Embodiments of the operations described herein may be implemented in a system that includes at least one tangible computer-readable storage device having stored thereon, individually or in combination, instructions that when executed by one or more processors perform the operations. The one or more processors may include, for example, a processing unit and/or programmable circuitry in the processor 110 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

In some embodiments, a hardware description language (HDL) may be used to specify circuit and/or logic implementation(s) for the various circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

Generally, this disclosure relates to a multi-device system. An apparatus, method and/or system are configured to allow a host device to couple to a plurality of peripheral devices that includes at least one secure device and at least one non-secure device. The apparatus, method and/or system are configured to differentiate between direct memory access (DMA) by a secure device or DMA by a non-secure device without modifications to the hardware.

EXAMPLES

Examples of the present disclosure include subject material such as a method, means for performing acts of the method, a device, or of an apparatus or system related to a multi-device system, as discussed below.

Example 1

According to this example there is provided an apparatus. The apparatus includes an input output memory management unit (I/O MMU) to couple an I/O Controller to a memory. The I/O Controller is coupled to a secure device and a non-secure device. The I/O Controller has one I/O Controller identifier. The apparatus further includes a non-secure operating system (OS) driver associated with the non-secure device; a secure OS driver associated with the secure device; and a virtual machine monitor (VMM) to allocate a secure address space to a secure OS and a non-secure address space to a non-secure OS. The secure address space is non-overlapping with the non-secure address space.

Example 2

This example includes the elements of example 1, wherein the secure OS is to allocate a random address in the secure address space in response to a request from the secure OS driver and the VMM is to store the allocated random address to an I/O MMU page table.

Example 3

This example includes the elements of example 2, wherein the VMM is to count I/O MMU page table faults in response to initiation of a secure operation, and the secure OS is to terminate the secure operation with failure if a number of I/O MMU page table faults is greater than a threshold.

Example 4

This example includes the elements according to any one of examples 1 to 3, wherein the VMM is to transfer control of each of one or more non-secure descriptors to the secure OS driver in response to a request for a secure operation, each non-secure descriptor to contain a target address associated with a direct memory access (DMA) operation.

Example 5

This example includes the elements of example 4, wherein the secure OS driver is to pause for a time interval to allow an outstanding non-secure descriptor to be consumed and the secure OS driver is further to attempt to validate a target address included in a remaining non-secure descriptor if fewer than all of the outstanding non-secure descriptors have been consumed after the time interval.

Example 6

This example includes the elements of example 4, wherein the secure OS driver is to allow the secure operation to proceed when each non-secure descriptor has been at least one of consumed and/or validated and moved to a secure address space as a protected non-secure descriptor.

Example 7

This example includes the elements of example 6, wherein the secure OS driver is to transfer each protected non-secure descriptor to the non-secure OS and to transfer control of each non-secure descriptor to the non-secure OS driver after the secure operation completes.

Example 8

This example includes the elements of example 4, wherein the secure OS driver is to copy each non-consumed non-secure descriptor to the secure address space as a protected non-secure descriptor to prevent write access by the non-secure OS.

Example 9

This example includes the elements according to any one of examples 1 to 3, wherein the secure device or the non-secure device is a dual use device.

Example 10

This example includes the elements of example 9, wherein the VMM is to allow an outstanding non-secure descriptor to be consumed, in response to a request for a secure operation, the secure operation and the non-secure descriptor associated with the dual use device.

Example 11

This example includes the elements of example 10, wherein the VMM is to transfer control of the dual use device from the non-secure OS driver to the secure OS driver after the outstanding non-secure descriptor is consumed.

Example 12

This example includes the elements of example 11, wherein the secure OS is to allocate a random address in the secure address space in response to a request from the secure OS driver and the VMM is to store the allocated random address to an I/O MMU page table.

Example 13

This example includes the elements of example 11, wherein the secure OS driver is to transfer control of the dual use device back to the non-secure OS driver after the secure operation completes.

Example 14

This example includes the elements according to any one of examples 1 to 3, further including a secure application, the secure application to implement a secure operation.

Example 15

This example includes the elements according to any one of examples 1 to 3, wherein each address in the secure address space has a most significant bit different from a most significant bit of each address in the non-secure address space.

Example 16

According to this example there is provided a method. The method includes coupling, by an input output memory management unit (I/O MMU), an I/O Controller to a memory. The I/O Controller is coupled to a secure device and a non-secure device. The I/O Controller has one I/O Controller identifier. The method further includes allocating, by a virtual machine monitor (VMM), a secure address space to a secure operating system (OS) and a non-secure address space to a non-secure OS. The secure address space is non-overlapping with the non-secure address space.

Example 17

This example includes the elements of example 16, further including allocating, by the secure OS, a random address in the secure address space in response to a request from a secure OS driver; and storing, by the VMM, the allocated random address to an I/O MMU page table.

Example 18

This example includes the elements of example 17, further including counting, by the VMM, I/O MMU page table faults in response to initiation of a secure operation; and terminating, by the secure OS, the secure operation with failure if a number of I/O MMU page table faults is greater than a threshold.

Example 19

This example includes the elements of example 16, further including transferring, by the VMM, control of each of one or more non-secure descriptors to a secure OS driver in response to a request for a secure operation, each non-secure descriptor to contain a target address associated with a direct memory access (DMA) operation.

Example 20

This example includes the elements of example 19, further including pausing, by the secure OS driver, for a time interval to allow an outstanding non-secure descriptor to be consumed; and attempting, by the secure OS driver, to validate a target address included in a remaining non-secure descriptor if fewer than all of the outstanding non-secure descriptors have been consumed after the time interval.

Example 21

This example includes the elements of example 19, further including allowing, by the secure OS driver, the secure operation to proceed when each non-secure descriptor has been at least one of consumed and/or validated and moved to a secure address space as a protected non-secure descriptor.

Example 22

This example includes the elements of example 21, further including transferring, by the secure OS driver, each protected non-secure descriptor to the non-secure OS; and transferring, by the secure OS driver, control of each non-secure descriptor to a non-secure OS driver after the secure operation completes.

Example 23

This example includes the elements of example 19, further including copying, by the secure OS driver, each non-consumed non-secure descriptor to the secure address space as a protected non-secure descriptor to prevent write access by the non-secure OS.

Example 24

This example includes the elements of example 16, wherein the secure device or the non-secure device is a dual use device.

Example 25

This example includes the elements of example 24, further including allowing, by the VMM, an outstanding non-secure descriptor to be consumed, in response to a request for a secure operation, the secure operation and the non-secure descriptor associated with the dual use device.

Example 26

This example includes the elements of example 25, further including transferring, by the VMM, control of the dual use device from a non-secure OS driver to a secure OS driver after the outstanding non-secure descriptor is consumed.

Example 27

This example includes the elements of example 26, further including allocating, by the secure OS, a random address in the secure address space in response to a request from the secure OS driver; and storing, by the VMM, the allocated random address to an I/O MMU page table.

Example 28

This example includes the elements of example 26, further including transferring, by the secure OS driver, control of the dual use device back to the non-secure OS driver after the secure operation completes.

Example 29

This example includes the elements of example 16, further including implementing, by a secure application, a secure operation.

Example 30

This example includes the elements of example 16, wherein each address in the secure address space has a most significant bit different from a most significant bit of each address in the non-secure address space.

Example 31

According to this example there is provided a system. The system includes a processor; a memory; a memory management unit (MMU) and an input output memory management unit (I/O MMU) to couple an I/O Controller to a memory. The I/O Controller is coupled to a secure device and a non-secure device. The I/O Controller has one I/O Controller identifier. The system further includes a non-secure operating system (OS) driver associated with the non-secure device; a secure OS driver associated with the secure device; and a virtual machine monitor (VMM) to allocate a secure address space to a secure OS and a non-secure address space to a non-secure OS. The secure address space is non-overlapping with the non-secure address space.

Example 32

This example includes the elements of example 31, wherein the secure OS is to allocate a random address in the secure address space in response to a request from the secure OS driver and the VMM is to store the allocated random address to an I/O MMU page table.

Example 33

This example includes the elements of example 32, wherein the VMM is to count I/O MMU page table faults in response to initiation of a secure operation, and the secure OS is to terminate the secure operation with failure if a number of I/O MMU page table faults is greater than a threshold.

Example 34

This example includes the elements according to any one of examples 31 to 33, wherein the VMM is to transfer control of each of one or more non-secure descriptors to the secure OS driver in response to a request for a secure operation, each non-secure descriptor to contain a target address associated with a direct memory access (DMA) operation.

Example 35

This example includes the elements of example 34, wherein the secure OS driver is to pause for a time interval to allow an outstanding non-secure descriptor to be consumed and the secure OS driver is further to attempt to validate a target address included in a remaining non-secure descriptor if fewer than all of the outstanding non-secure descriptors have been consumed after the time interval.

Example 36

This example includes the elements of example 34, wherein the secure OS driver is to allow the secure operation to proceed when each non-secure descriptor has been at least one of consumed and/or validated and moved to a secure address space as a protected non-secure descriptor.

Example 37

This example includes the elements of example 36, wherein the secure OS driver is to transfer each protected non-secure descriptor to the non-secure OS and to transfer control of each non-secure descriptor to the non-secure OS driver after the secure operation completes.

Example 38

This example includes the elements of example 34, wherein the secure OS driver is to copy each non-consumed non-secure descriptor to the secure address space as a protected non-secure descriptor to prevent write access by the non-secure OS.

Example 39

This example includes the elements according to any one of examples 31 to 33, wherein the secure device or the non-secure device is a dual use device.

Example 40

This example includes the elements of example 39, wherein the VMM is to allow an outstanding non-secure descriptor to be consumed, in response to a request for a secure operation, the secure operation and the non-secure descriptor associated with the dual use device.

Example 41

This example includes the elements of example 40, wherein the VMM is to transfer control of the dual use device from the non-secure OS driver to the secure OS driver after the outstanding non-secure descriptor is consumed.

Example 42

This example includes the elements of example 41, wherein the secure OS is to allocate a random address in the secure address space in response to a request from the secure OS driver and the VMM is to store the allocated random address to an I/O MMU page table.

Example 43

This example includes the elements of example 41, wherein the secure OS driver is to transfer control of the dual use device back to the non-secure OS driver after the secure operation completes.

Example 44

This example includes the elements according to any one of examples 31 to 33, further including a secure application, the secure application to implement a secure operation.

Example 45

This example includes the elements according to any one of examples 31 to 33, wherein each address in the secure address space has a most significant bit different from a most significant bit of each address in the non-secure address space Example 46

According to this example there is provided a computer readable storage device. The computer readable storage device has stored thereon instructions that when executed by one or more processors result in the following operations including coupling an I/O Controller to a memory. The I/O Controller is coupled to a secure device and a non-secure device. The I/O Controller has one I/O Controller identifier. The instructions that when executed by one or more processors result in the following additional operations including allocating a secure address space to a secure operating system (OS) and a non-secure address space to a non-secure OS. The secure address space is non-overlapping with the non-secure address space.

Example 47

This example includes the elements of example 46, wherein the instructions that when executed by one or more processors results in the following additional operations including allocating a random address in the secure address space in response to a request from a secure OS driver; and storing the allocated random address to an I/O MMU (Input/Output memory management unit) page table.

Example 48

This example includes the elements of example 47, wherein the instructions that when executed by one or more processors results in the following additional operations including counting I/O MMU page table faults in response to initiation of a secure operation; and terminating the secure operation with failure if a number of I/O MMU page table faults is greater than a threshold.

Example 49

This example includes the elements according to any one of examples 46 to 48, wherein the instructions that when executed by one or more processors results in the following additional operations including transferring control of each of one or more non-secure descriptors to a secure OS driver in response to a request for a secure operation, each non-secure descriptor to contain a target address associated with a direct memory access (DMA) operation.

Example 50

This example includes the elements of example 49, wherein the instructions that when executed by one or more processors results in the following additional operations including pausing for a time interval to allow an outstanding non-secure descriptor to be consumed; and attempting to validate a target address included in a remaining non-secure descriptor if fewer than all of the outstanding non-secure descriptors have been consumed after the time interval.

Example 51

This example includes the elements of example 49, wherein the instructions that when executed by one or more processors results in the following additional operations including allowing the secure operation to proceed when each non-secure descriptor has been at least one of consumed and/or validated and moved to a secure address space as a protected non-secure descriptor.

Example 52

This example includes the elements of example 51, wherein the instructions that when executed by one or more processors results in the following additional operations including transferring each protected non-secure descriptor to the non-secure OS; and transferring control of each non-secure descriptor to a non-secure OS driver after the secure operation completes.

Example 53

This example includes the elements of example 49, wherein the instructions that when executed by one or more processors results in the following additional operations including copying each non-consumed non-secure descriptor to the secure address space as a protected non-secure descriptor to prevent write access by the non-secure OS.

Example 54

This example includes the elements according to any one of examples 46 to 48, wherein the secure device or the non-secure device is a dual use device.

Example 55

This example includes the elements of example 54, wherein the instructions that when executed by one or more processors results in the following additional operations including allowing an outstanding non-secure descriptor to be consumed, in response to a request for a secure operation, the secure operation and the non-secure descriptor associated with the dual use device.

Example 56

This example includes the elements of example 55, wherein the instructions that when executed by one or more processors results in the following additional operations including transferring control of the dual use device from a non-secure OS driver to a secure OS driver after the outstanding non-secure descriptor is consumed.

Example 57

This example includes the elements of example 56, wherein the instructions that when executed by one or more processors results in the following additional operations including allocating a random address in the secure address space in response to a request from the secure OS driver; and storing the allocated random address to an I/O MMU page table.

Example 58

This example includes the elements of example 56, wherein the instructions that when executed by one or more processors results in the following additional operations including transferring control of the dual use device back to the non-secure OS driver after the secure operation completes.

Example 59

This example includes the elements according to any one of examples 46 to 48, wherein the instructions that when executed by one or more processors results in the following additional operations including implementing a secure operation.

Example 60

This example includes the elements according to any one of examples 46 to 48, wherein each address in the secure address space has a most significant bit different from a most significant bit of each address in the non-secure address space.

Example 61

According to this example there is provided a device. The device includes means for coupling, by an input output memory management unit (I/O MMU), an I/O Controller to a memory. The I/O Controller is coupled to a secure device and a non-secure device. The I/O Controller has one I/O Controller identifier. The device further includes means for allocating, by a virtual machine monitor (VMM), a secure address space to a secure operating system (OS) and a non-secure address space to a non-secure OS. The secure address space non-overlapping with the non-secure address space.

Example 62

This example includes the elements of example 61, further including means for allocating, by the secure OS, a random address in the secure address space in response to a request from a secure OS driver; and means for storing, by the VMM, the allocated random address to an I/O MMU page table.

Example 63

This example includes the elements of example 62, further including means for counting, by the VMM, I/O MMU page table faults in response to initiation of a secure operation; and means for terminating, by the secure OS, the secure operation with failure if a number of I/O MMU page table faults is greater than a threshold.

Example 64

This example includes the elements according to any one of examples 61 to 63, further including means for transferring, by the VMM, control of each of one or more non-secure descriptors to a secure OS driver in response to a request for a secure operation, each non-secure descriptor to contain a target address associated with a direct memory access (DMA) operation.

Example 65

This example includes the elements of example 64, further including means for pausing, by the secure OS driver, for a time interval to allow an outstanding non-secure descriptor to be consumed; and means for attempting, by the secure OS driver, to validate a target address included in a remaining non-secure descriptor if fewer than all of the outstanding non-secure descriptors have been consumed after the time interval.

Example 66

This example includes the elements of example 64, further including means for allowing, by the secure OS driver, the secure operation to proceed when each non-secure descriptor has been at least one of consumed and/or validated and moved to a secure address space as a protected non-secure descriptor.

Example 67

This example includes the elements of example 66, further including means for transferring, by the secure OS driver, each protected non-secure descriptor to the non-secure OS; and means for transferring, by the secure OS driver, control of each non-secure descriptor to a non-secure OS driver after the secure operation completes.

Example 68

This example includes the elements of example 64, further including means for copying, by the secure OS driver, each non-consumed non-secure descriptor to the secure address space as a protected non-secure descriptor to prevent write access by the non-secure OS.

Example 69

This example includes the elements according to any one of examples 61 to 63, wherein the secure device or the non-secure device is a dual use device.

Example 70

This example includes the elements of example 69, further including means for allowing, by the VMM, an outstanding non-secure descriptor to be consumed, in response to a request for a secure operation, the secure operation and the non-secure descriptor associated with the dual use device.

Example 71

This example includes the elements of example 70, further including means for transferring, by the VMM, control of the dual use device from a non-secure OS driver to a secure OS driver after the outstanding non-secure descriptor is consumed.

Example 72

This example includes the elements of example 71, further including means for allocating, by the secure OS, a random address in the secure address space in response to a request from the secure OS driver; and means for storing, by the VMM, the allocated random address to an I/O MMU page table.

Example 73

This example includes the elements of example 71, further including means for transferring, by the secure OS driver, control of the dual use device back to the non-secure OS driver after the secure operation completes.

Example 74

This example includes the elements according to any one of examples 61 to 63, further including means for implementing, by a secure application, a secure operation.

Example 75

This example includes the elements according to any one of examples 61 to 63, wherein each address in the secure address space has a most significant bit different from a most significant bit of each address in the non-secure address space.

Example 76

According to this example there is provided a system. The system includes at least one device arranged to perform the method of any one of examples 16 to 30.

Example 77

According to this example there is provided a device. The device includes means to perform the method of any one of examples 16 to 30.

Example 78

According to this example there is provided a computer readable storage device. The computer readable storage device has stored thereon instructions that when executed by one or more processors result in the following operations including: the method according to any one of examples 16 through 30.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
an input output memory management unit (I/O MMU) to couple an I/O Controller to a memory, the I/O Controller coupled to a secure device and a non-secure device, the I/O Controller having one I/O Controller identifier;
a non-secure operating system (OS) driver associated with the non-secure device;
a secure OS driver associated with the secure device; and
a virtual machine monitor (VMM) to allocate a secure address space to a secure OS and a non-secure address space to a non-secure OS, the secure address space non-overlapping with the non-secure address space;
wherein the secure OS is to allocate a random address in the secure address space in response to a request from the secure OS driver, the VMM is to store the allocated random address to an I/O MMU page table and count I/O MMU page table faults in response to initiation of a secure operation, and the secure OS is to terminate the secure operation with failure if a number of I/O MMU page table faults is greater than a threshold; and/or
wherein the VMM is to transfer control of each of one or more non-secure descriptors to the secure OS driver in response to a request for a secure operation, each non-secure descriptor to contain a target address associated with a direct memory access (DMA) operation, and the secure OS driver is to allow the secure operation to proceed when each non-secure descriptor has been at least one of consumed and/or validated and moved to a secure address space as a protected non-secure descriptor.

2. The apparatus of claim 1, wherein the secure OS is to allocate the random address in the secure address space in response to the request from the secure OS driver and the VMM is to store the allocated random address to the I/O MMU page table; and wherein the VMM is to count I/O MMU page table faults in response to initiation of the secure operation, and the secure OS is to terminate the secure operation with failure if the number of I/O MMU page table faults is greater than the threshold.

3. The apparatus of claim 1, wherein the VMM is to transfer control of each of one or more non-secure descriptors to the secure OS driver in response to the request for the secure operation, each non-secure descriptor to contain the target address associated with the DMA operation; and
wherein the secure OS driver is to pause for a time interval to allow an outstanding non-secure descriptor to be consumed and the secure OS driver is further to attempt to validate the target address included in a remaining non-secure descriptor if fewer than all of the outstanding non-secure descriptors have been consumed after the time interval.

4. The apparatus of claim 1, wherein the VMM is to transfer control of each of one or more non-secure descriptors to the secure OS driver in response to the request for the secure operation, each non-secure descriptor to contain the target address associated with the DMA operation; and
wherein the secure OS driver is to allow the secure operation to proceed when each non-secure descriptor has been at least one of consumed and/or validated and moved to a secure address space as the protected non-secure descriptor.

5. The apparatus of claim 1, wherein the secure device or the non-secure device is a dual use device.

6. A method comprising:
coupling, by an input output memory management unit (I/O MMU), an I/O Controller to a memory, the I/O Controller coupled to a secure device and a non-secure device, the I/O Controller having one I/O Controller identifier;
allocating, by a virtual machine monitor (VMM), a secure address space to a secure operating system (OS) and a non-secure address space to a non-secure OS, the secure address space non-overlapping with the non-secure address space; and
performing at least one of operation A or operation B,
wherein operation A comprises:
allocating, by the secure OS, a random address in the secure address space in response to a request from a secure OS driver; and storing, by the VMM, the allocated random address to an I/O MMU page table; and
counting, by the VMM, I/O MMU page table faults in response to initiation of a secure operation; and terminating, by the secure OS, the secure operation with failure if a number of I/O MMU page table faults is greater than a threshold; and
wherein operation B comprises:
transferring, by the VMM, control of each of one or more non-secure descriptors to a secure OS driver in response to a request for a secure operation, each non-secure descriptor to contain a target address associated with a direct memory access (DMA) operation; and
allowing, by the secure OS driver, the secure operation to proceed when each non-secure descriptor has been at least one of consumed and/or validated and moved to a secure address space as a protected non-secure descriptor.

7. The method of claim 6, further comprising:
allocating, by the secure OS, the random address in the secure address space in response to the request from the secure OS driver;
storing, by the VMM, the allocated random address to the I/O MMU page table;
counting, by the VMM, I/O MMU page table faults in response to initiation of the secure operation; and
terminating, by the secure OS, the secure operation with failure if the number of I/O MMU page table faults is greater than the threshold.

8. The method of claim 6, further comprising:
transferring, by the VMM, control of each of one or more non-secure descriptors to the secure OS driver in response to the request for a secure operation, each non-secure descriptor to contain the target address associated with the DMA operation;
pausing, by the secure OS driver, for a time interval to allow an outstanding non-secure descriptor to be consumed; and
attempting, by the secure OS driver, to validate the target address included in a remaining non-secure descriptor if fewer than all of the outstanding non-secure descriptors have been consumed after the time interval.

9. The method of claim 6, further comprising:
transferring, by the VMM, control of each of one or more non-secure descriptors to the secure OS driver in response to the request for a secure operation, each non-secure descriptor to contain the target address associated with the DMA operation;
allowing, by the secure OS driver, the secure operation to proceed when each non-secure descriptor has been at least one of consumed and/or validated and moved to the secure address space as the protected non-secure descriptor.

10. The method of claim 6, wherein the secure device or the non-secure device is a dual use device.

11. A computer readable storage device having stored thereon instructions that when executed by one or more processors result in the following operations comprising:
coupling an I/O Controller to a memory, the I/O Controller coupled to a secure device and a non-secure device, the I/O Controller having one I/O Controller identifier;
allocating a secure address space to a secure operating system (OS) and a non-secure address space to a non-secure OS, the secure address space non-overlapping with the non-secure address space; and
performing at least one of operation A or operation B,
wherein operation A comprises:
allocating, by the secure OS, a random address in the secure address space in response to a request from a secure OS driver; and storing, by the VMM, the allocated random address to an I/O MMU page table; and
counting, by the VMM, I/O MMU page table faults in response to initiation of a secure operation; and terminating, by the secure OS, the secure operation with failure if a number of I/O MMU page table faults is greater than a threshold; and
wherein operation B comprises:
transferring, by the VMM, control of each of one or more non-secure descriptors to a secure OS driver in response to a request for a secure operation, each non-secure descriptor to contain a target address associated with a direct memory access (DMA) operation; and allowing, by the secure OS driver, the secure operation to proceed when each non-secure descriptor has been at least one of consumed and/or validated and moved to a secure address space as a protected non-secure descriptor.

12. The device of claim 11, wherein the instructions that when executed by one or more processors results in the following additional operations comprising:
   allocating the random address in the secure address space in response to the request from the secure OS driver;
   storing the allocated random address to the I/O MMU page table;
   counting I/O MMU page table faults in response to initiation of the secure operation; and
   terminating the secure operation with failure if the number of I/O MMU page table faults is greater than the threshold.

13. The device of claim 11, wherein the instructions that when executed by one or more processors results in the following additional operations comprising:
   transferring control of each of one or more non-secure descriptors to the secure OS driver in response to the request for the secure operation, each non-secure descriptor to contain the target address associated with the DMA operation;
   pausing for a time interval to allow an outstanding non-secure descriptor to be consumed; and
   attempting to validate the target address included in a remaining non-secure descriptor if fewer than all of the outstanding non-secure descriptors have been consumed after the time interval.

14. The device of claim 11, wherein the instructions that when executed by one or more processors results in the following additional operations comprising:
   transferring control of each of one or more non-secure descriptors to the secure OS driver in response to the request for the secure operation, each non-secure descriptor to contain the target address associated with the DMA operation;
   allowing the secure operation to proceed when each non-secure descriptor has been at least one of consumed and/or validated and moved to the secure address space as the protected non-secure descriptor.

15. The device of claim 11, wherein the secure device or the non-secure device is a dual use device.

* * * * *